United States Patent
Walessa

(10) Patent No.: US 10,386,483 B2
(45) Date of Patent: Aug. 20, 2019

(54) PROCESSING SENSOR MEASUREMENTS OF A VEHICLE ENVIRONMENT WITH LOW TRANSVERSE RESOLUTION

(71) Applicant: Bayerische Motoren Werke Aktiengesellschaft, Munich (DE)

(72) Inventor: Marc Walessa, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 185 days.

(21) Appl. No.: 15/665,569

(22) Filed: Aug. 1, 2017

(65) Prior Publication Data

US 2017/0329008 A1    Nov. 16, 2017

(30) Foreign Application Priority Data

Feb. 2, 2015    (DE) .................. 10 2015 201 706

(51) Int. Cl.
  *G01S 15/93*    (2006.01)
  *G01S 7/53*     (2006.01)
  (Continued)

(52) U.S. Cl.
  CPC ........ *G01S 15/931* (2013.01); *B60W 30/095* (2013.01); *G01S 7/53* (2013.01);
  (Continued)

(58) Field of Classification Search
  None
  See application file for complete search history.

(56) References Cited

U.S. PATENT DOCUMENTS 6,087,928 A * 7/2000 Kleinberg ............. B60Q 9/008
                                                 340/435
6,163,252 A * 12/2000 Nishiwaki ............ B60Q 9/006
                                                 340/435
(Continued)

FOREIGN PATENT DOCUMENTS

DE           198 56 974 C1    9/2000
DE    10 2012 020 413 A1    4/2014
(Continued)

OTHER PUBLICATIONS

International Search Report (PCT/ISA/210) issued in PCT Application No. PCT/EP2016/051893 dated May 6, 2016 with English translation (seven pages).
(Continued)

*Primary Examiner* — Shelley Chen
(74) *Attorney, Agent, or Firm* — Crowell & Moring LLP

(57) ABSTRACT

An environment map includes cells, each of which is assigned to portions of the environment of a vehicle and each of which is assigned an obstacle probability that represents the probability that the corresponding portion of the environment is occupied by an obstacle. The vehicle has at least two environment sensors, each of which is designed to provide measurement data on the occupancy of a region of the environment by an obstacle, referred to as an obstacle region, in the respective detection region of the sensor. The measurement data describes obstacle regions which extend over multiple portions of the environment, and the detection regions of the environment sensors at most partly overlap. A method for providing the environment map for the vehicle has the following steps: receiving the measurement data from the at least two environment sensors, the measurement data of a first environment sensor identifying an obstacle region; determining occupancy probabilities for the portions of the environment covered by the identified obstacle region (Continued)

of the measurement data of the first environment sensor on the basis of the measurement data of at least one other environment sensor, wherein an occupancy probability for a portion indicates the probability that the corresponding portion of the environment is occupied by an obstacle; and updating the obstacle probability of the environmental map for at least the portions for which the occupancy probability has been determined.

13 Claims, 3 Drawing Sheets

(51) Int. Cl.
    G01S 15/89      (2006.01)
    B60W 30/095     (2012.01)
    G01S 13/93      (2006.01)
    G01S 17/02      (2006.01)
    G05D 1/02       (2006.01)
    G08G 1/16       (2006.01)
(52) U.S. Cl.
    CPC ............ *G01S 13/931* (2013.01); *G01S 15/89* (2013.01); *G01S 17/023* (2013.01); *G05D 1/0257* (2013.01); *G08G 1/165* (2013.01); *G08G 1/166* (2013.01); *G01S 2015/933* (2013.01)

(56) References Cited

U.S. PATENT DOCUMENTS

| | | | |
|---|---|---|---|
| 6,384,718 B1 | 5/2002 | Nass et al. | |
| 7,142,150 B2 * | 11/2006 | Thackray | G01S 7/41 342/54 |
| 7,266,477 B2 * | 9/2007 | Foessel | G01S 13/723 340/436 |
| 7,498,972 B2 * | 3/2009 | Tanaka | G01S 17/936 342/104 |
| 8,427,472 B2 * | 4/2013 | Moravec | G05D 1/0251 345/419 |
| 8,744,744 B2 * | 6/2014 | Takagi | B60W 40/04 701/301 |
| 8,798,841 B1 * | 8/2014 | Nickolaou | B62D 15/0265 701/23 |
| 9,020,637 B2 * | 4/2015 | Schnittman | G05D 1/0219 382/106 |
| 2006/0178828 A1 * | 8/2006 | Moravec | G05D 1/0251 345/424 |
| 2006/0293856 A1 * | 12/2006 | Foessel | B60W 30/09 701/301 |
| 2007/0005306 A1 * | 1/2007 | Foessel | G01S 13/723 702/189 |
| 2007/0285305 A1 * | 12/2007 | Tanaka | G01S 17/936 342/70 |
| 2008/0027591 A1 * | 1/2008 | Lenser | G05D 1/0251 701/2 |
| 2008/0252433 A1 * | 10/2008 | Yguel | G08G 1/161 340/435 |
| 2012/0053755 A1 * | 3/2012 | Takagi | B60W 40/04 701/1 |
| 2014/0058581 A1 * | 2/2014 | Dierks | B60W 50/00 701/1 |
| 2014/0129027 A1 * | 5/2014 | Schnittman | G05D 1/0219 700/253 |
| 2015/0073707 A1 * | 3/2015 | Ma | G01C 21/165 701/501 |
| 2017/0057495 A1 | 3/2017 | Walessa | |

FOREIGN PATENT DOCUMENTS

| | | |
|---|---|---|
| DE | 10 2013 200 793 A1 | 7/2014 |
| DE | 10 2014 208 967 A1 | 11/2015 |
| EP | 1 672 390 A1 | 6/2006 |
| EP | 1 731 922 A1 | 12/2006 |
| GB | 2512440 A | 10/2014 |

OTHER PUBLICATIONS

German-language Written Opinion (PCT/ISA/237) issued in PCT Application No. PCT/EP2016/051893 dated May 6, 2016 (six pages).

German Search Report issued in counterpart German Application No. 10 2015 201 706.0 dated Oct. 13, 2015 with partial English translation (12 pages).

Wilkes et al., "Multi-transducer sonar interpretations", Proceedings of the International Conference on Robotics and Automation Atlanta, May 2-6, 1993, pp. 392-397, Los Alamitos, IEEE Comp. Soc. Press, US, XP010095235.

* cited by examiner

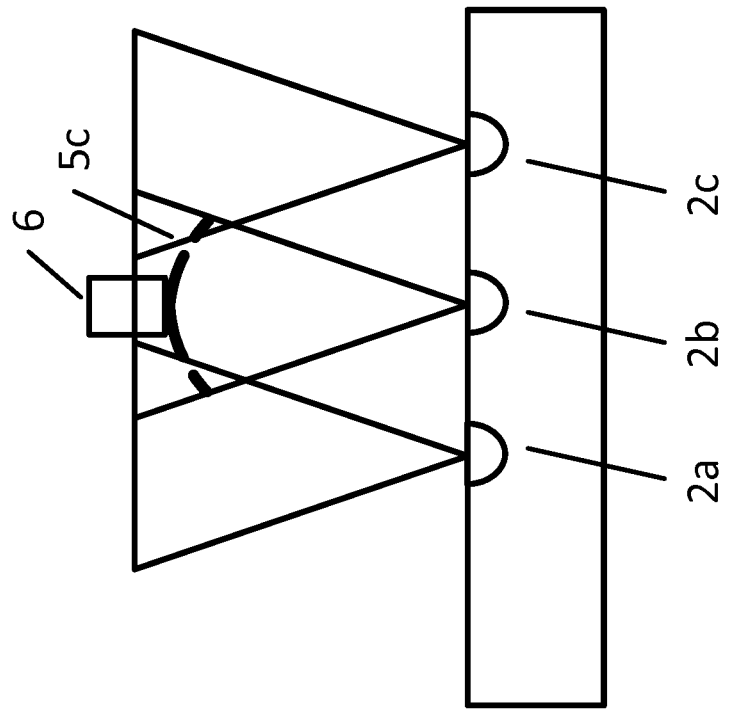
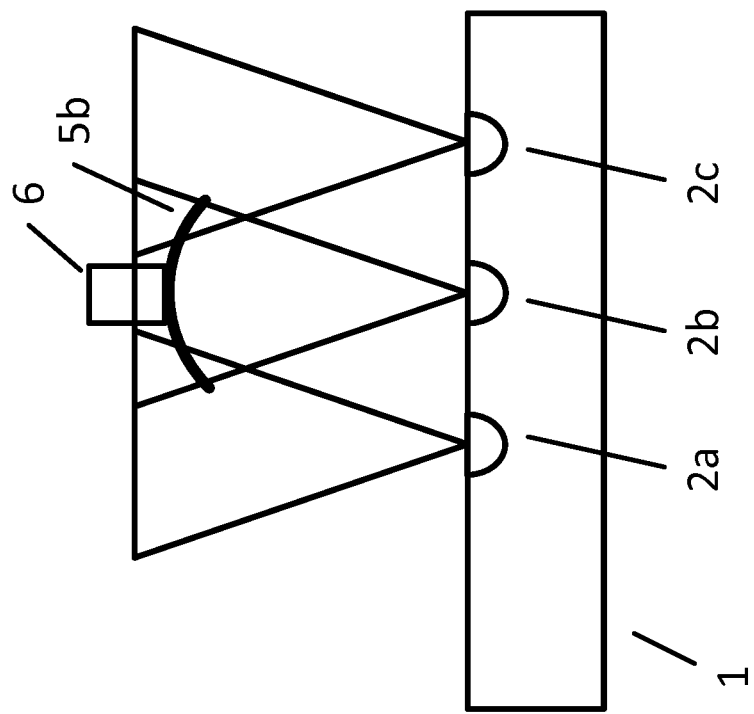

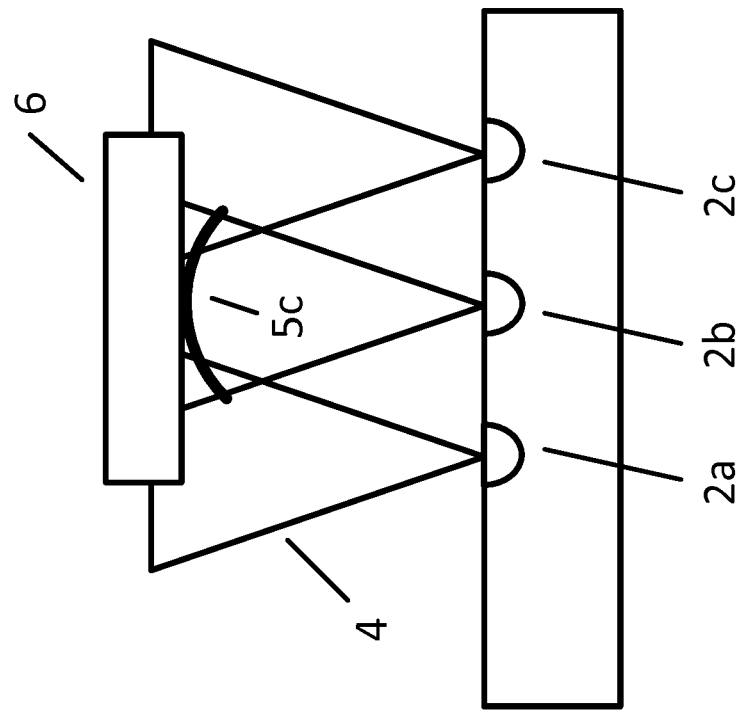
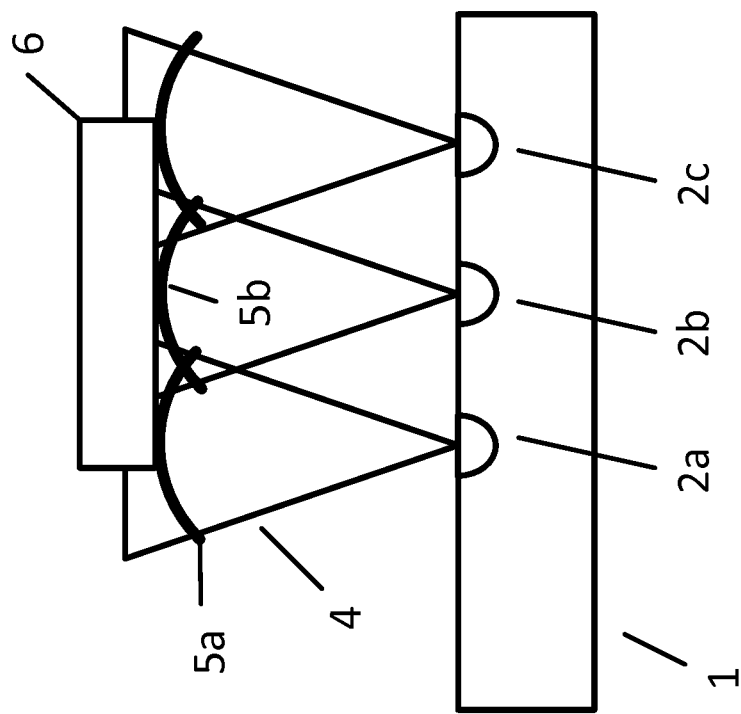
Fig. 3A
Fig. 3B

PROCESSING SENSOR MEASUREMENTS OF A VEHICLE ENVIRONMENT WITH LOW TRANSVERSE RESOLUTION

CROSS REFERENCE TO RELATED APPLICATIONS

This application is a continuation of PCT International Application No. PCT/EP2016/051893, filed Jan. 29, 2016, which claims priority under 35 U.S.C. § 119 from German Patent Application No. 10 2015 201 706.0, filed Feb. 2, 2015, the entire disclosures of which are herein expressly incorporated by reference.

BACKGROUND AND SUMMARY OF THE INVENTION

The invention relates to a method for providing an environment map for a vehicle and a corresponding electronic computing device.

It is currently known to capture the surroundings of a vehicle with the aid of sensors such as cameras, lidar, radar or ultrasound. The measurements are often represented in an environment map (sometimes also referred to as a grid), the latter comprising cells to which portions of the surroundings (e.g. 8 cm×8 cm) of the vehicle are assigned. The representation is frequently effectuated by specifying the probability of the portion of the surroundings that is assigned to the respective cell being occupied by an obstacle (obstacle probability). For this reason, this type of environment map is often also referred to as an occupancy grid. Building on the environment map, it is possible to realize many driver assistance systems, such as autonomous cruise control (ACC), highly automated driving or emergency braking assistants, etc. Grid-based approaches for modeling the surroundings (creation of an environment map) are also used with increasing frequency for driver assistance functions, also in the parking and maneuvering context.

During the operation of a vehicle, the environment map is filled in accordance with the measured distance values from a distance-providing sensor system that relate to obstacles in any direction. The measured distance values from a sensor (e.g. an ultrasonic sensor) are converted into an occupancy probability of portions of the surroundings taking into account an obstacle region in the environment map that corresponds in size to the measurement uncertainty and are determined for the corresponding cells. Typically, the obstacle region is greater than a portion of the surroundings that is assigned to a cell, which is why the ascertained obstacle region extends over a plurality of portions and corresponding cells. Usually, the occupancy probabilities are not entered directly as obstacle probabilities into the environment map (even though this is also possible), but instead they are combined by calculation with the previously determined obstacle probabilities. This facilitates a temporal accumulation, and hence averaging, of measurements, which at least partly compensates measurement errors.

Here, the occupancy probabilities ascertained with the aid of the measurement data from a sensor are entered independently of the measurement data from other sensors from one another. This means that the occupancy probabilities that result from the measurement data from a respective sensor are successively entered into the environment map for the purposes of updating the obstacle probabilities.

As a result of the occupancy probabilities that are ascertained with the aid of one sensor being determined independently of the occupancy probabilities that are ascertained with the aid of measurement values from other sensors and said former occupancy probabilities being used to update the obstacle probabilities of the environment map, the loss of important information is possible, particularly in the case of sensors with a low transverse resolution such as ultrasonic sensors and overlapping fields of view. On account of the low transverse resolution, occupancies (high occupancy probabilities) are ascertained in the transverse direction or azimuth direction for more portions than actually correspond to the extent of the obstacle in the transverse direction. Expressed differently, "elongated" obstacles and other unwanted artifacts arise in the environment map as a result of these effects.

This is disadvantageous for driver assistance functions, particularly for parking and maneuvering assistants, which require not only a distance information item but also an accurate localization of obstacles.

The Applicant's pending application DE 10 2014 208 967 describes a system for capturing surroundings and providing an environment map. Therein, making a distinction between ramps and obstacles, in particular, is highlighted.

The object underlying the invention is that of reducing the aforementioned disadvantages.

This and other objects are achieved by a method and an electronic computing device in accordance with embodiments of the invention.

A first aspect of the invention relates to a method for providing an environment map for a vehicle, wherein the environment map comprises cells which are each assigned to portions of the surroundings of the vehicle and which each have allocated an obstacle probability, the latter representing the probability that the corresponding portion of the surroundings is occupied by an obstacle; wherein the vehicle comprises at least two surroundings sensors, which are each embodied to provide measurement data in relation to the occupancy of a region of the surroundings, referred to as obstacle region, by an obstacle in their respective capture region; wherein the measurement data (only) describe obstacle regions which extend over a plurality of portions of the surroundings; wherein the capture regions of the surroundings sensors overlap at most in part; wherein the method comprises the following steps: receiving the measurement data from the at least two surroundings sensors; wherein the measurement data from a first surroundings sensor have an obstacle region; determining occupancy probabilities for those portions of the surroundings which are covered by the established obstacle region in the measurement data from the first surroundings sensor, depending on the measurement data from at least a further one of the surroundings sensors; wherein an occupancy probability for a portion specifies the probability that the corresponding portion of the surroundings is occupied by an obstacle; updating the obstacle probability of the environment map for at least those portions for which the occupancy probability was determined.

The surroundings sensors are often embodied to recognize the distance to an obstacle, independently of the position of the obstacle in the capture region. Thus, all that is recognized is that, and at what distance, an obstacle is situated in the capture region. Consequently, only this information (and optionally other additional information for processing, but no additional information relating to the position of the obstacle) is consequently comprised in the sensor data from a surroundings sensor.

Thus, what is proposed here is also taking account of the measurement data from a further surroundings sensor when ascertaining the occupancy probabilities on the basis of the measurement data from a surroundings sensor. The occupancy probabilities, by which the environment map is updated, are determined depending on the measurement data from the further sensor. A simple example in this respect is that if the sensor measurement values from the first sensor indicate occupancy but the sensor measurement values from an adjacent sensor indicate no occupancy, the occupancy probability at the edge facing the adjacent sensor is selected to be lower than at the other edge.

By explicitly taking into account dependencies of the sensors among themselves when filling an environment map, it is possible to achieve more accurate and more artifact-free filling of the measurement values into the environment map. This results in fewer interferences and a more accurate localization of obstacles which, for example, significantly improves obstacle-free trajectory planning for automated vehicle guidance on the basis of the environment map and only renders certain driver assistance functions possible, particularly in tight maneuvering scenarios with high demands on the positional accuracy of the obstacles.

When an appropriately configured electronic computing unit is in operation, an environment map substantially is a data structure which comprises cells as subunits that are filled with data relating to the occupancy probability of the corresponding surroundings portion.

Here, occupancy probability, obstacle probability and the term "probability" in general are understood to be measures for the corresponding probabilities and not necessarily the correctly ascertained probability itself.

An obstacle means the presence of a living or non-living object, as a result of which the region of the surroundings occupied by the object is impassible.

If the sensor data from the two surroundings sensors indicate that one sensor has captured an object but the other has not, different occupancy probabilities are determined for at least two different covered portions.

The occupancy probability of the portions of the obstacle occupancy may be determined in accordance with a linear function or any other desired continuous or discontinuous function, with the boundary conditions of the function being predetermined by the sensor data from the considered surroundings sensor and from the adjacent surroundings sensors. Here, provision can be made for only capturing the presence or absence of an obstacle in the respective capture region of the sensor to be of importance for the purposes of determining the boundary conditions. The boundary conditions may set which covered portions are allocated which occupancy probability.

By way of example, the boundary conditions may be determined in such a way that, provided that the considered sensor data indicate an obstacle but the sensor data from the further surroundings sensor do not, the occupancy probability of the portion which is furthest away from the capture region of the further surroundings sensor is set to a predetermined maximum value and the occupancy probability of the portion which is closest to the capture region of the further surroundings sensor is set to a further predetermined minimum value. The occupancy probabilities of the intermediate portions are ascertained in accordance with a linear function.

In so doing, the occupancy probability of the portions that are covered by the obstacle occupancy is determined, up to a constant, in accordance with a linear function or any other desired continuous or discontinuous function, wherein the function is predetermined by the sensor data from the considered surroundings sensor and from the at least one further surroundings sensor. The function may be stored in a predetermined (lookup) table and optionally predetermine occupancy probabilities for all covered portions. In order to predetermine the function, it is possible to take into account whether the sensor data from the surroundings sensors indicate the presence or absence of an obstacle. In this way, it is possible to obtain a similar function, like by the use of boundary conditions, and the aforementioned example can likewise be realized.

The spatial relationship between the capture regions of the first surroundings sensor and of the at least one further surroundings sensor is typically taken into account when determining the occupancy probabilities. If the capture regions of the surroundings sensors are not adjacent or do not overlap (possibly with 0.3 m, 0.5 m or more clear space between the capture regions), the influence of the sensor data from the further surroundings sensor on the occupancy probabilities of the covered portions may be smaller than if the capture regions of the surroundings sensors adjoin one another or do overlap.

In one implementation, the vehicle comprises at least three surroundings sensors, the capture regions of which are next to one another and in each case adjacent to one another and said capture regions overlap at most in part in each case; wherein the method comprises the following steps: receiving the measurement data from the at least three surroundings sensors; wherein the measurement data from the central surroundings sensor have an obstacle region; determining the occupancy probability for those portions of the surroundings which are covered by the established obstacle region in the measurement data from the central surroundings sensor, depending on the measurement data from the two adjacent surroundings sensors. Here, the occupancy probability can be determined depending on whether the measurement data from only one adjacent surroundings sensor or from both adjacent surroundings sensors have an obstacle region.

Hence, in this case, the determination of the occupancy probabilities of the covered portions is dependent on two adjacent sensors. Provision can be made for the occupancy probability of the covered central sections (which at least do not adjoin both adjacent capture regions or have a minimum distance therefrom) to be determined by capturing the obstacle by the central sensor. The occupancy probabilities of the edge portions (not the central portions) can then be determined by the recognized presence or absence of an obstacle in the adjacent capture regions. By way of example, the function for the occupancy probability may be selected depending on the recognized presence or absence of an obstacle. In one embodiment, this may mean that the highest occupancy probability of the covered portions is determined for the occupancy probability of one or more covered portions that do not lie on the edge of the obstacle region if the sensor data from both adjacent surroundings sensors do not have an obstacle region in each case.

In a typical implementation, the obstacle probabilities previously stored in the environment map are complemented by the occupancy probabilities when updating the obstacle probability, in particular its obstacle probability and occupancy probability that are stored for a portion are combined by calculation. The combination by calculation may comprise the summation of the logarithm of the occupancy probability and/or of the logarithm of the obstacle probability, sometimes referred to as "LogOdds". Hence, the obstacle probability is a filtering of the occupancy probabilities over time, which facilitates the correction of measurement errors. Conversely, the aforementioned methods may also be carried out in such a way that the obstacle probability is set to the occupancy probability. Thus, no filtering is carried out in this case.

Another aspect of the invention relates to an electronic computing device for vehicles, wherein the electronic computing device is configured to carry out one of the methods explained above. The electronic computing device may be a microcontroller, a typical desktop computer, an application-specific circuit or a general computer.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 2A and 2B symbolically show the processing of sensor data in accordance with a further exemplary embodiment.

FIGS. 3A and 3B symbolically show the processing of sensor data in accordance with a third exemplary embodiment.

The same reference signs relate to corresponding elements over all figures.

DETAILED DESCRIPTION OF THE DRAWINGS

Figure 1A:
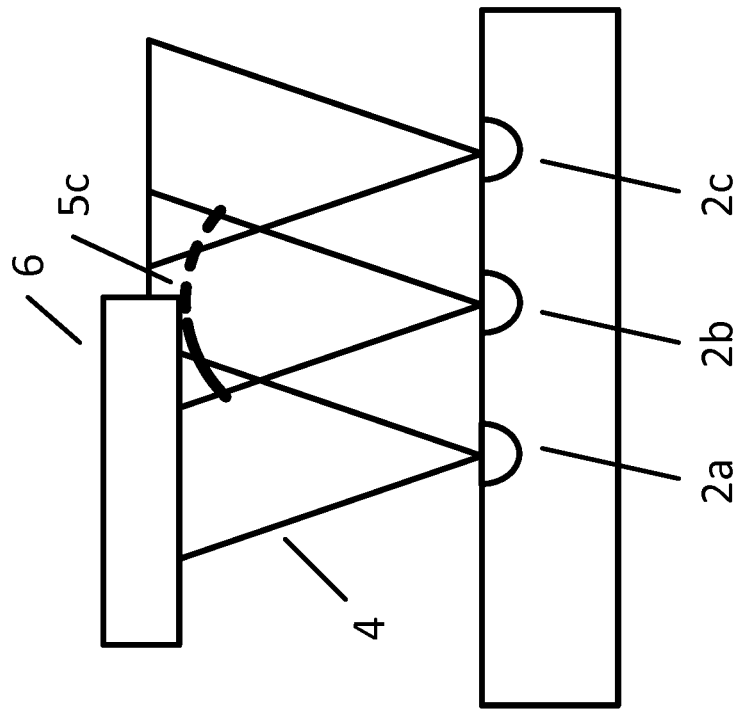
FIGS. 1A and 1B symbolically show the processing of sensor data in accordance with an exemplary embodiment.

FIG. 1A symbolically shows the capture of obstacles using ultrasonic sensors in accordance with an exemplary embodiment. Ultrasonic sensors 2a, 2b and 2c are adjacently embedded in the body 1 of a vehicle. The ultrasonic sensors lie next to one another and respectively have a capture region 4. The capture region has an aperture angle of approximately 50° and the capture regions of the sensors overlap. Within this capture region, the sensors 2a and 2b can determine the distance to an obstacle 6, but cannot determine the angle of the obstacle in relation to the sensor (azimuth). For this reason, an obstacle region 5a, 5b is allocated to a captured distance. The sensor data from both sensors 2a and 2b indicate an obstacle. The sensor data of sensor 2c indicate the absence of an obstacle. When creating the environment map, each sensor is queried in succession and the received sensor data are processed to form occupancy probabilities in order, ultimately, to determine the obstacle probabilities for the environment map. In FIGS. 1A, 1B, 2A, 2B, 3A AND 3B, the occupancy probability for the sensor 2b (considered sensor) should be determined in each case. Here, an occupancy probability of p>0.5 means probable occupancy. A probability of p=0.5 means that the cell is 50% occupied and 50% unoccupied, i.e. the state is "unknown". An occupancy probability of p<0.5 means a probable non-occupancy (absence of an obstacle).

Figure 1B:
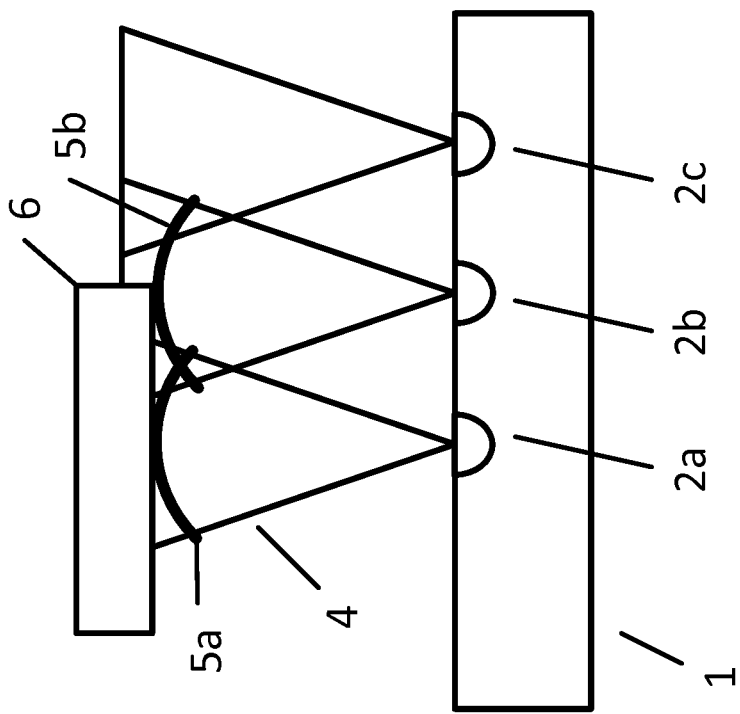

FIG. 1B symbolically shows what occupancy probability is calculated for the sensor 2b in accordance with the exemplary embodiment. During operation, the last sensor data of the sensors 2a and 2b are recognized as indicating the presence of an obstacle and the sensor data of the sensor 2c are recognized as indicating the absence of an obstacle. The occupancy probabilities for the covered portions are determined on the basis of a table that is stored in advance. The table contains an entry for the case, considered in FIG. 1A, of the identified presences and absences of obstacles. The function of how the occupancy probabilities should be allocated to the portions is realized in the table by storing numerical values for each portion. Here, the portions in the table are specified relative to one another and the transfer to the environment map is effectuated by way of the absolute positioning by means of the measured distance.

In the present case, the stored occupancy probabilities provide a split into two. In the half of the portions that are assigned to the capture region of the sensor 2a, a first occupancy probability is set, for example 0.8 (full line in FIG. 1B). A second occupancy probability (e.g. 0.6) is set in the other half (which faces the sensor 2c), with the second occupancy probability being smaller than the first occupancy probability (dashed line in FIG. 1B). In general, the gradations of the occupancy probabilities may also be substantially finer, and so three, four or five levels are provided; a dedicated occupancy probability can be provided for each portion.

FIGS. 2A and 2B show the case where an obstacle 6 lies only in the capture region of the sensor 2b. Occupancy probabilities that are stored in the table for this case are selected for the covered portions on the basis of the recognized presences and absences from the sensors. Here, the central portions (solid line) are allocated the higher occupancy probability and the portions at the edge are each allocated the lower occupancy probability (dashed line).

FIGS. 3A and 3B show the case where an obstacle 6 is recognized by all three sensors. Once again, occupancy probabilities that are stored in the table for this case are selected for the covered portions on the basis of the recognized presences and absences from the sensors. Here, the higher occupancy probability is allocated to all portions (solid line).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing an environment map for a vehicle, wherein
    the environment map comprises cells, each of which is assigned to portions of surroundings of the vehicle and each of which is assigned an obstacle probability that represents the probability that the corresponding portion of the surroundings is occupied by an obstacle;
    the vehicle comprises at least two surroundings sensors, each of which is configured to provide measurement data on the occupancy of a region of the surroundings by an obstacle (an obstacle region) in the respective capture region;
    the measurement data describe obstacle regions which extend over a plurality of portions of the surroundings; and
    the capture regions of the surroundings sensors overlap at most in part;
    wherein the method comprises the acts of:
    receiving the measurement data from the at least two surroundings sensors, wherein the measurement data from a first surroundings sensor have an obstacle region;
    determining occupancy probabilities for those portions of the surroundings which are covered by the established obstacle region in the measurement data from the first surroundings sensor, depending on the measurement data from at least a further one of the surroundings sensors, wherein an occupancy probability for a portion specifies the probability that the corresponding portion of the surroundings is occupied by an obstacle; and updating the obstacle probability of the environment map for at least those portions for which the occupancy probability was determined, wherein the occupancy probability for a covered portion which is situated at a first distance from the capture region of the further sensor depends more strongly on the measurement data from the further sensor than the occupancy probability for a covered portion which is situated at a greater distance than the first distance from the capture region of the further sensor.

2. The method as claimed in claim 1, wherein different occupancy probabilities are determined for at least two different covered portions.

3. The method as claimed in claim 1, wherein the occupancy probability of the portions that are covered by the obstacle occupancy are determined, up to a constant, in accordance with a linear function or other desired continuous or discontinuous function, and the function is predetermined by the sensor data from the considered surroundings sensor and from the at least one further surroundings sensor.

4. The method as claimed in claim 1, wherein the spatial relationship between the capture regions of the first surroundings sensor and of the at least one further surroundings sensor is taken into account when determining the occupancy probabilities.

5. The method as claimed in claim 1, wherein the measurement data from the further sensor have no obstacle region; and the occupancy probability for a covered portion which is situated at a first distance from the capture region of the further sensor is determined to have a lower value than the occupancy probability for a covered portion that is situated at a greater distance than the first distance from the capture region of the further sensor.

6. The method as claimed in claim 1, wherein the vehicle comprises at least three surroundings sensors, the capture regions of which are next to one another and in each case adjacent to one another, and said capture regions overlap at most in part in each case;

wherein the method further comprises the acts of:

receiving the measurement data from the at least three surroundings sensors, wherein the measurement data from the central surroundings sensor have an obstacle region;

determining the occupancy probability for those portions of the surroundings which are covered by the established obstacle region in the measurement data from the central surroundings sensor, depending on the measurement data from the two adjacent surroundings sensors.

7. The method as claimed in claim 6, wherein the occupancy probability is determined depending on whether the measurement data from only one adjacent surroundings sensor or from both adjacent surroundings sensors have an obstacle region.

8. The method as claimed in claim 7, wherein the highest occupancy probability of the covered portions is determined for the occupancy probability of one or more covered portions that do not lie on the edge of the obstacle region if the sensor data from both adjacent surroundings sensors do not have an obstacle region in each case.

9. The method as claimed in claim 1, wherein the measurement data provide the distance of an obstacle from the respective surroundings sensor, and the measurement data do not provide any information about the extent of the obstacle in the capture region.

10. The method as claimed in claim 9, wherein the surroundings sensors are ultrasonic sensors.

11. The method as claimed in claim 1, wherein the obstacle probabilities previously stored in the environment map are complemented by the occupancy probabilities when updating the obstacle probability.

12. The method as claimed in claim 11, wherein the obstacle probabilities previously stored in the occupancy probabilities when updating the obstacle probability are combined via calculation.

13. An electronic computing device for a vehicle, wherein the electronic computing device is configured to execute the method as claimed in claim 1.

* * * * *